United States Patent [19]

Nakao

[11] Patent Number: 5,748,290
[45] Date of Patent: May 5, 1998

[54] METHOD AND APPARATUS FOR FEEDING AND WINDING PLURAL FILM

[75] Inventor: Hiroto Nakao, Wakayama, Japan

[73] Assignee: Noritsu Koki Co., Ltd., Wakayama, Japan

[21] Appl. No.: 540,179

[22] Filed: Oct. 6, 1995

[30] Foreign Application Priority Data

Oct. 7, 1994 [JP] Japan ............................ 6-244203

[51] Int. Cl.⁶ ..................... G03B 27/62; G03B 27/64
[52] U.S. Cl. ................... 355/75; 355/50; 355/19; 355/40; 242/348
[58] Field of Search ........................ 355/75, 50, 77, 355/18, 40; 242/348.1, 532, 332.7

[56] References Cited

U.S. PATENT DOCUMENTS

| | | | |
|---|---|---|---|
| 4,461,554 | 7/1984 | Norris et al. | 354/275 |
| 5,149,004 | 9/1992 | Sadau et al. | 242/57 |
| 5,275,347 | 1/1994 | Keeney et al. | 242/71.1 |
| 5,395,068 | 3/1995 | Kostudus et al. | 242/348.1 |
| 5,546,160 | 8/1996 | Kishi et al. | 355/50 |

Primary Examiner—R. L. Moses
Assistant Examiner—Shival P. Virmani
Attorney, Agent, or Firm—Wenderoth, Lind & Ponack

[57] ABSTRACT

A film feeder/winder is capable of winding films compactly, feeding films backward and keeping films damage-free. A plurality of films wound in a magazine case are fed one by one into a film guide. The film guide is partially openable, so that a film being fed backward can be looped by protruding from the film guide. Films are fed into a scanner/exposure unit for scanning and printing. After printing, films are fed into another magazine case and wound into a roll. It is possible to print any additional films by inserting them into an inlet opening of an extra passage branching from the film feed path. Also, a film being fed backward may be guided into this extra passage until it protrudes from the inlet opening. Both magazine cases have guides and rollers for smoothly winding films around their respective film take-up cores.

11 Claims, 15 Drawing Sheets

METHOD AND APPARATUS FOR FEEDING AND WINDING PLURAL FILM

BACKGROUND OF THE INVENTION

This invention relates to a method of printing films by feeding them through a scanner unit and an exposure unit, a device for storing films after printing, and a device for automatically feeding and storing films.

In order to print photographic images recorded on developed films, they are fed one by one through a scanner unit and an exposure unit in a photoprinting machine. In the scanner unit, image data are read from each frame of the film. In the exposure unit, images on the film are printed after adjusting the amount of light based on the image data.

For such printing, films have to fed one by one into the scanner unit and the exposure unit. After printing, the films have to be stored in a predetermined place. Heretofore, films were either manually fed one by one into a film feed path or automatically fed into the film feed path after splicing and winding them into a roll.

Unexamined Japanese Patent Publication 5-53205 proposes to store printed films by stacking them.

In another conventional arrangement, scanning and exposure are carried out at the same location. Namely, films are scanned while being fed forward and printed while being fed backward.

In the method in which films are manually fed for printing and manually stored after printing, the operator cannot leave the printing device even for a moment. Workability and efficiency of printing are thus not good.

In the method in which films are fed automatically and continuously, films are positioned by detecting the marginal portions between the adjacent image frames of films when reading image data of each frame with a color scanner. But if a film has some image-missing frames, it cannot be positioned accurately because no clear marginal portions are detectable. For accurate positioning of such a film, it has to be fed backward manually, and then fed forward again.

In order to feed a long web of film backward, it has to be temporarily stored in a loop form. But no conventional automatic film feed device provides this function. Thus, heretofore, it was impossible to feed films backward, so that accurate positioning of films having image-missing frames was impossible.

After printing, films have to be stored in an appropriate manner. In the abovementioned prior art, films were stored simply by stacking them one on another. Such stacked films are difficult to handle. Their images can be easily damaged.

For higher workability and compactness of the printing device, each film may be fed back and forth twice, first for scanning and then for printing. Heretofore, in order to process films in this manner, most of each film was pushed out of the film feed path after scanning. The portion of the film protruding from the film feed path can be easily damaged, especially if the film is a long one.

A first object of this invention is to provide a compact film storage means. A second object of this invention is to provide a means which makes it possible to feed films backward so that even films having image-missing frames can be positioned accurately and to store films smoothly after printing. A third object is to provide a means which can prevent damage to films after scanning when feeding films back and forth twice, first for scanning and then for printing.

SUMMARY OF THE INVENTION

According to the present invention, there is provided a film storage device provided in a photoprinting device having a scanner unit and an exposure unit at a film discharge port of the exposure unit. The film storage device includes: a magazine case provided at the film discharge port of the exposure unit, a motor-driven film take-up core rotatably mounted in the magazine case, a plurality of film take-up guides provided around the film take-up core so that their free ends are movable toward and away from the axis of the film take-up core, and a plurality of rollers each carried by a respective take-up guide at its free end. The film take-up guides guide and wind films around the film take-up core, the rollers being spring-biased toward the axis of the film take-up core. A film introducing guide is provided at a film inlet port of the magazine case for guiding films discharged from the exposure unit into the magazine case.

In one embodiment, the magazine case has a means for moving the film take-up guides and the rollers away from the axis of the film take-up core, while the film take-up core is detachably mounted in the magazine case. In another embodiment, the magazine case can be detachably mounted on the exposure unit at its film discharge port with one end of the inlet port of the magazine case opposite to one end of the film discharge port of the exposure unit and with the one end of the inlet port opposite to the other end of the film discharge port. The magazine case has an electric connector for longitudinal printing and an electric connector for lateral printing. One of the electric connectors for longitudinal printing and transverse printing is adapted to be connected to an electric connector of the exposure unit provided near the film discharge port when the magazine case is mounted on the exposure unit with the one end of the inlet port opposite to the one end of the film discharge port, while the other of the electric connectors for longitudinal printing and transverse printing is adapted to be connected to the electric connector of the exposure unit when the magazine case is mounted on the exposure unit with the one end of the inlet port opposite to the other end of the film discharge port.

In another aspect of the invention, there is provided an automatic film feed/storage device for automatically feeding films to a scanner unit and an exposure unit of a photoprinting device and automatically storing films after printing. The automatic film feed/storage device includes a film magazine detachably mounted on an outer case of the photoprinting device and having a film take-up core, a feed roller for feeding a plurality of films wound around the film take-up core one by one out of the film magazine, a film guide for guiding films fed out of the film magazine into a film feed path in the outer case, carrier rollers for feeding films in the film feed path into the scanner unit and the exposure unit, and the abovementioned film storage device. The film guide has a loop guide adapted to be moved to an open position by being pushed by a film which is being fed backward and slackening in the film guide.

The film guide may comprise an inner guide and an outer guide between which is defined a film passage, the outer guide having a window in which is fitted the loop guide, the loop guide having its rear end, with respect to the film feed direction, pivotally supported. The inner guide may be a rotary drum. A first extra film passage for inserting extra films may be formed to branches from a connecting point between the film passage defined between the inner and outer guides and the film feed path in the outer case.

In another embodiment, a second extra film passage is provided which branches from the connecting point between the film passage defined between the inner and outer guides and the film feed path in the outer case, and a non-return guide is provided at the branch point of the second extra film passage for guiding a film being fed backward in the film feed path into the second extra film passage, while preventing the film from feeding into the film guide. Such a non-return guide may be provided at the branch point of the first extra film passage, while omitting the second extra film feed passage.

In another aspect of the invention, there is provided a method of printing films by feeding films into a scanner unit and an exposure unit of a photoprinting machine using the automatic film feed/storage device having the non-return guide, the scanner unit and the exposure unit being provided at the same location along a film feed path. The method includes the steps of feeding a film into the scanner unit, scanning the film while feeding the scanned portion of the film into the film storage device, feeding the film backward after scanning so that the film is guided into the first extra film passage or the second extra film passage and is looped at an opening of the first or second extra film passage, feeding the film guided into the first or second extra film passage into the exposure unit, and printing the film while feeding the printed portion of the film into the film storage device.

Further, there is provided a method of printing films by feeding films into a scanner unit and an exposure unit of a photoprinting machine using the automatic film feed/storage device having the non-return guide, the scanner unit and the exposure unit being provided at the same location along a film feed path. The method the steps of attaching the film storage device to an opening of the first extra film passage of the second extra film passage, attaching a film looping means to the film discharge port of the exposure unit, feeding a film into the scanner unit, scanning the film while feeding the scanned portion of the film to the film looping means to store the film by looping it, feeding the film backward after scanning so as to print the film while passing through the exposure unit and guiding the printed film through the first or second extra film passage into the film storage device.

According to the invention of the film storage device, when films are fed into the magazine case through its film inlet opening, they are guided by the film take-up guides and wound one by one around the rotating film take-up core. Since the outermost one of the films wound around the core is pressed by the rollers, they will never slacken.

When a predetermined amount of films have been wound around the core, they are taken out of the magazine case together with the core.

By mounting the magazine case in two opposite ways, films can be printed either longitudinally or laterally.

According to the invention of the automatic film feed/ storage device, films stored in the film magazine are fed one by one through the film guide into the scanner unit and the exposure unit. After scanning and printing, they are stored in the abovementioned film storage device.

If a film has image-missing frames, it is fed backward by reversing carrier rollers. If its rear end is held between feed rollers in this state, the loop guide will be pushed open by the portion of the film in the film guide, so that the film will be looped by protruding from the film guide. Thus, the film can be smoothly fed backward.

By using the inner guide in the form of a rotary drum, films can be fed even more smoothly along the arcuate outer periphery of the drum. By inserting extra films into the first extra film passage, it is possible to print these films while interrupting the feed of the films from the film guide.

By providing the non-return guide, it is possible to guide films which are fed backward into the extra passage while preventing them from entering into the film guide. Thus, films can be fed backward for a long distance.

In the printing method according to the present invention, films are temporarily stored by looping them at the film discharge port of the exposure unit. Films are thus less likely to be damaged.

Other features and objects of the present invention will become apparent from the following description made with reference to the accompanying drawings, in which:

DETAILED DESCRIPTION OF THE PREFERRED EMBODIMENTS

Figure 1:
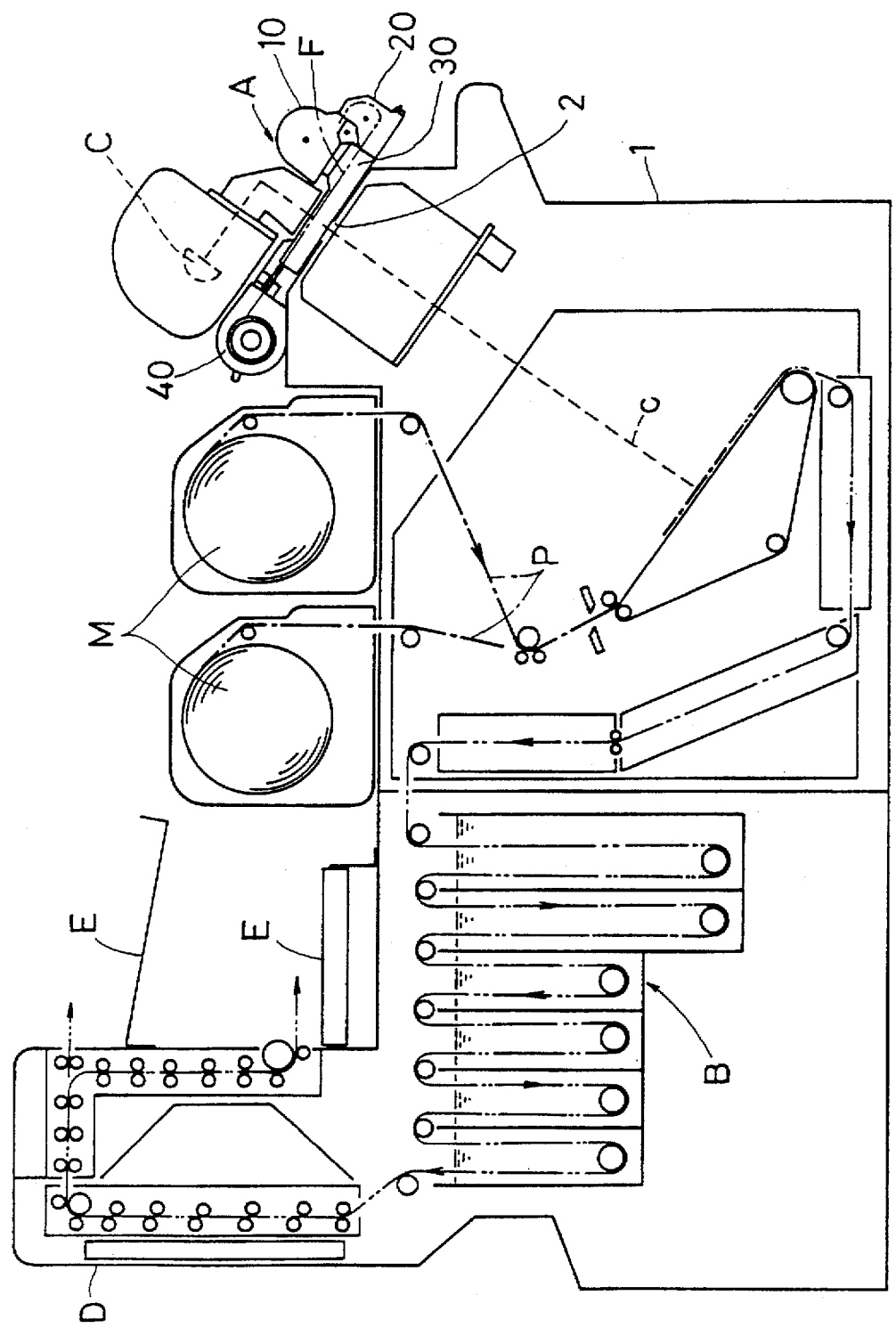
FIG. 1 is a schematic view of a photoprinting machine provided with a device of one embodiment of the invention.

FIG. 1 schematically shows a photoprinting machine of a first embodiment. It has an automatic film feeding/winding device A on top of an outer case 1 at one corner. The device A has an automatic film feeder 10 in which is stored a web of film F. The film F pulled out of the feeder 10 is fed through a scanner/exposure unit (negative mask 2) into a film winder 40. While being fed through the negative mask 2, images on the film F are scanned and printed onto printing paper P being fed from a paper magazine M by irradiating the film F with the light from a light source C. The paper P thus printed is fed through a developing unit B and a drying unit D into a stocker E.

Figure 2:
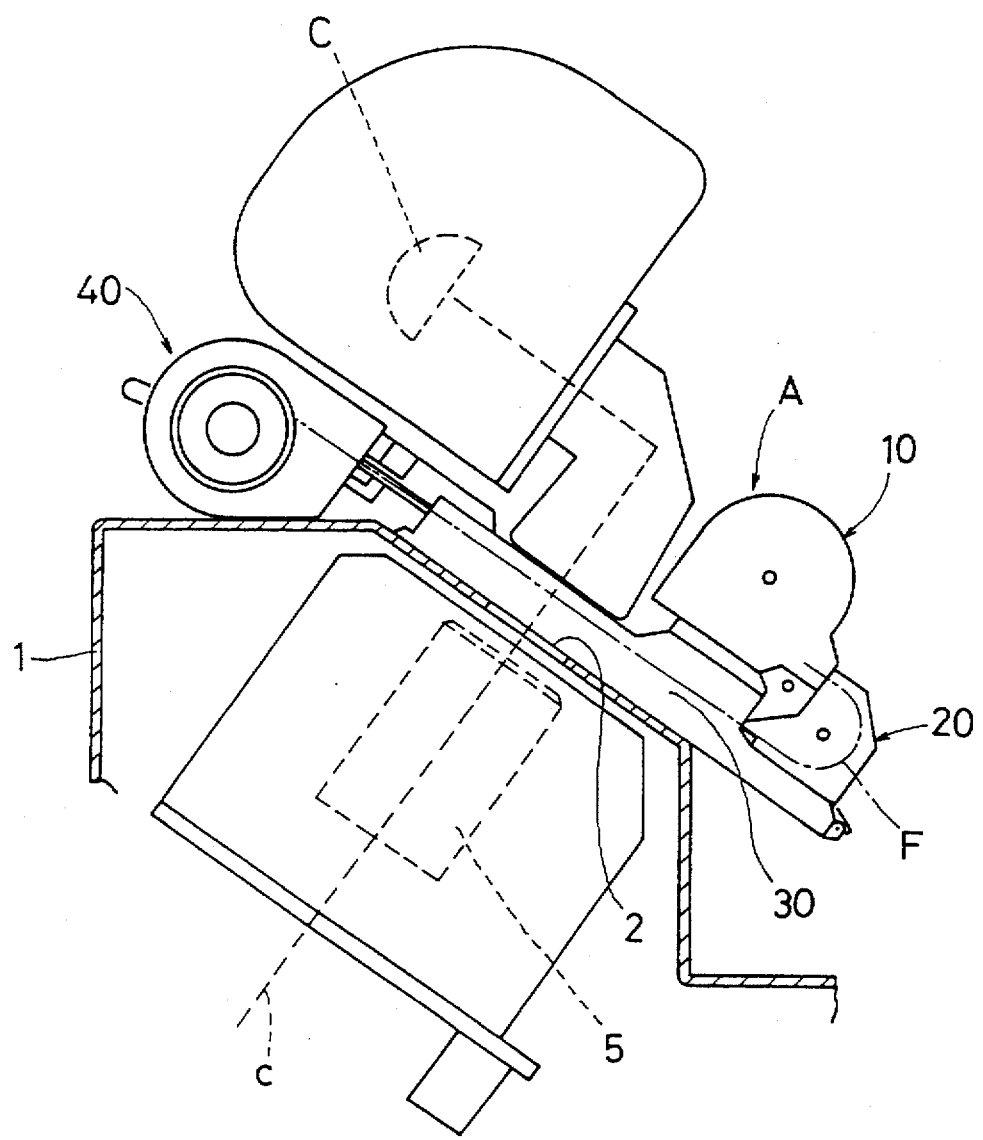
FIG. 2 is a partial enlarged view of FIG. 1.
Figure 3:
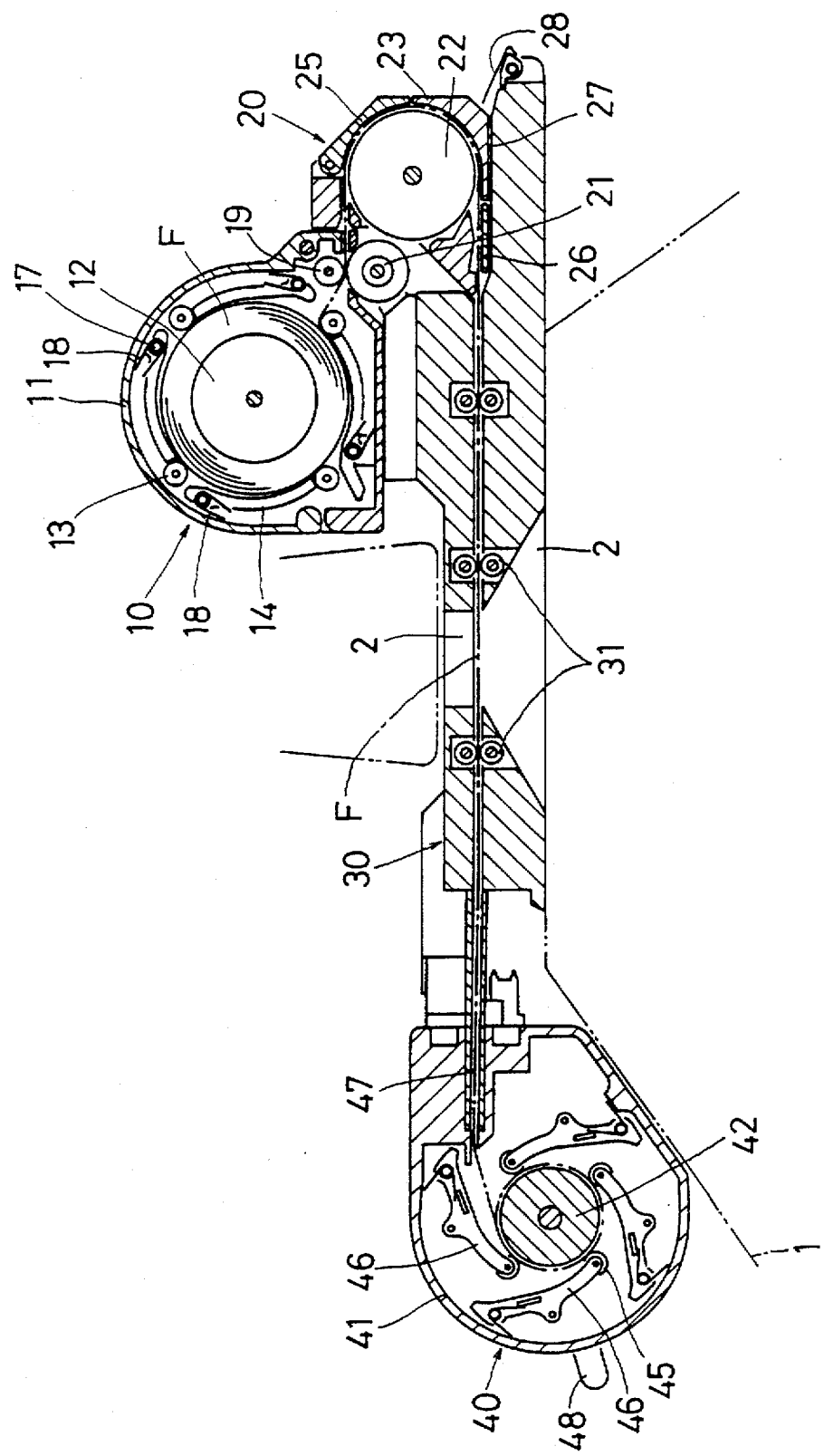
FIG. 3 is a sectional front view of such embodiment.

Referring to FIGS. 2 and 3, the automatic film feeding/ winding device A according to the present invention comprises the automatic film feeder 10, a guide unit 20, a film carrier unit 30 for moving each image on film F into alignment with the optical axis c of the light from the light source C (on the negative mask 2), and the film winder 40.

Figure 4:
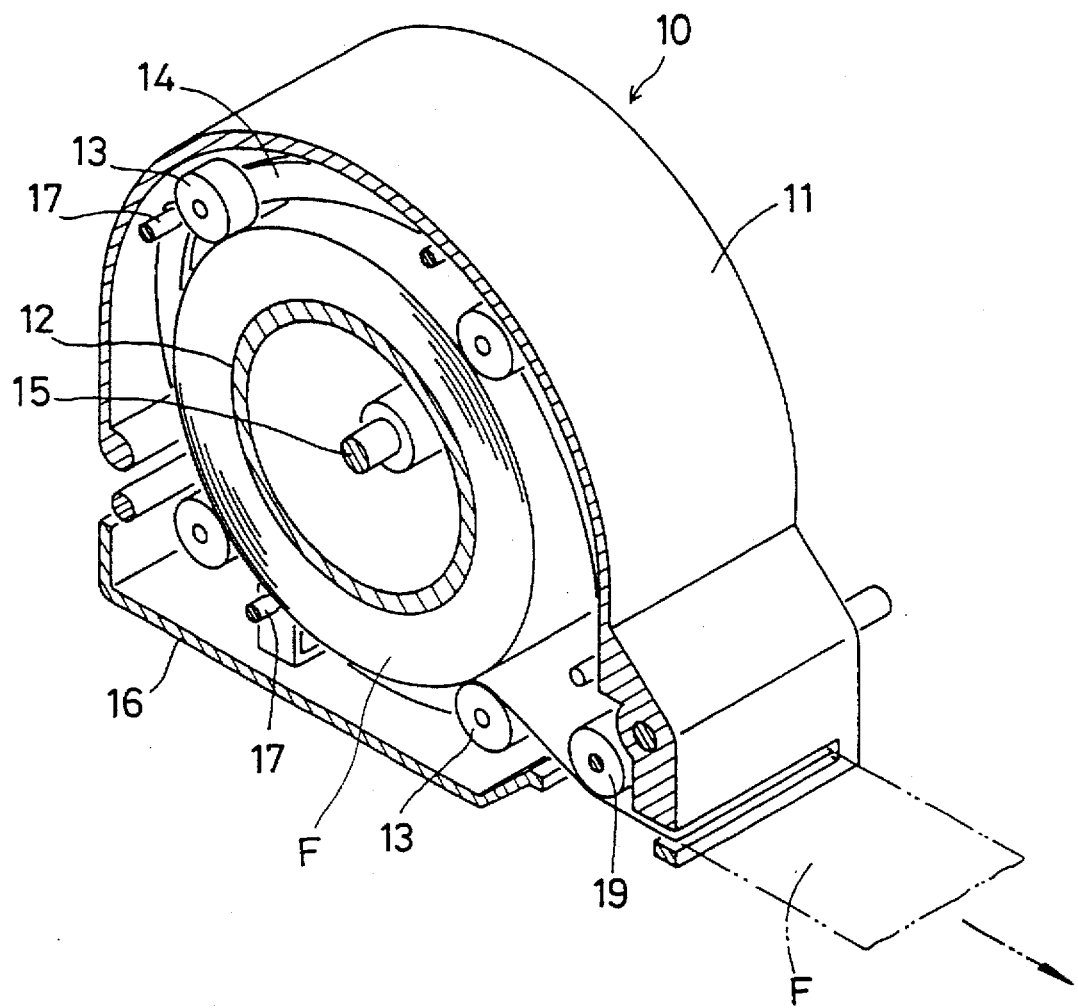
FIG. 4 is a partially cutaway perspective view of an automatic film feeder.

As shown in FIGS. 3 and 4, the automatic film feeder 10 comprises a film take-up core 12 rotatable about a shaft 15, and a plurality of (four in the illustrated embodiment) film guides 14 each carrying a film presser roller 13 for pressing films toward the center (axis) of the core 12. They are housed in a detachable magazine case 11. The case 11 has a lid 16.

The film guides 14 are pivotally supported on separate shafts 17. Springs 18 bias the guides 14 to press rollers 13 lightly against films F toward the center of the core 12. The springs 18 may be coil springs wound around the shafts 17, or leaf springs extending along the guides 14.

Figure 5:
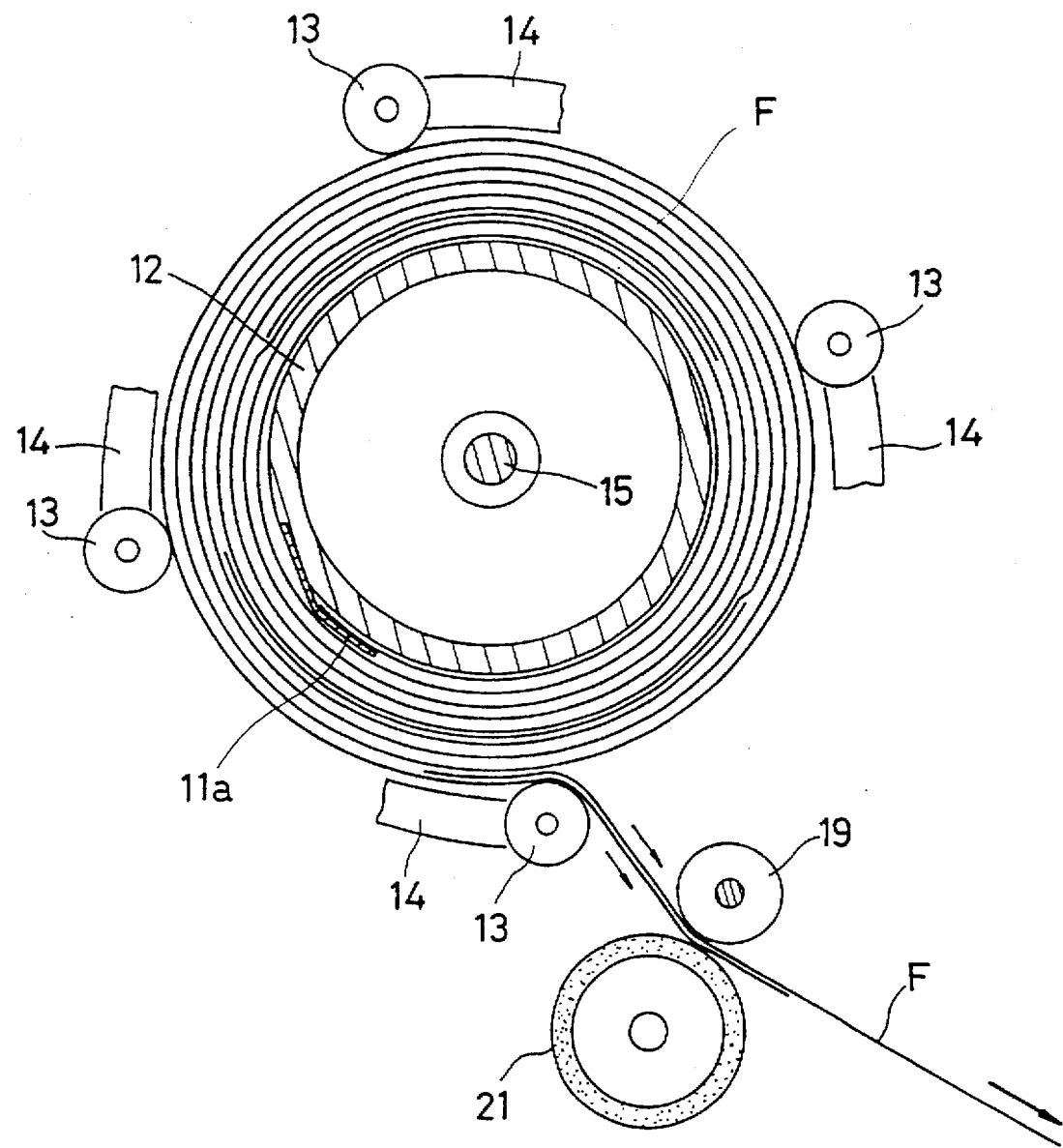
FIG. 5 is a side view illustrating the operation of the automatic film feeder.

Referring to FIG. 5, a plurality of (e.g. 5–10) films F are stored in the magazine case 11 with their respective rear ends overlapping with the leading ends of the adjacent films. Films F have no image frames at the overlapping end portions. Since films F are extremely thin, the diameter of the roll of films will not increase substantially by overlapping their ends. The leading end of the innermost film F is fastened in position with a single hook 11a.

Films F are wound one after another around the core 12 by inserting the leading end of each film under the rear end of the preceding film. Since the overlapping portions of the films are always pressed by the film presser rollers 13, they can be fed continuously.

In order to wind films F into the magazine case 11, after opening the lid 16, films are fed one after another into the magazine so that the leading end of each film is slid under the rear end of the preceding film.

Figure 6:
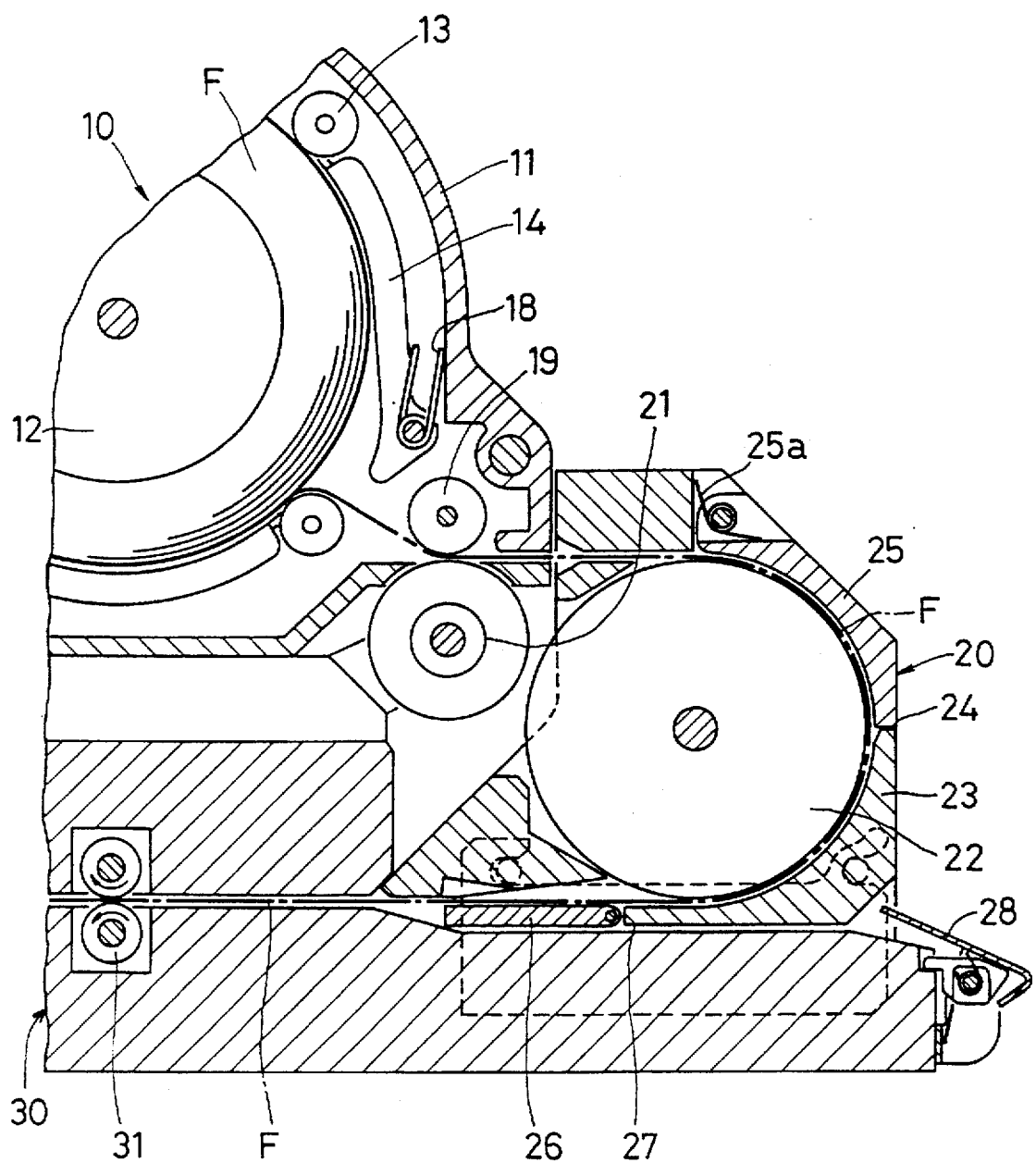
FIG. 6 is a partial enlarged view of FIG. 2.
Figure 7:
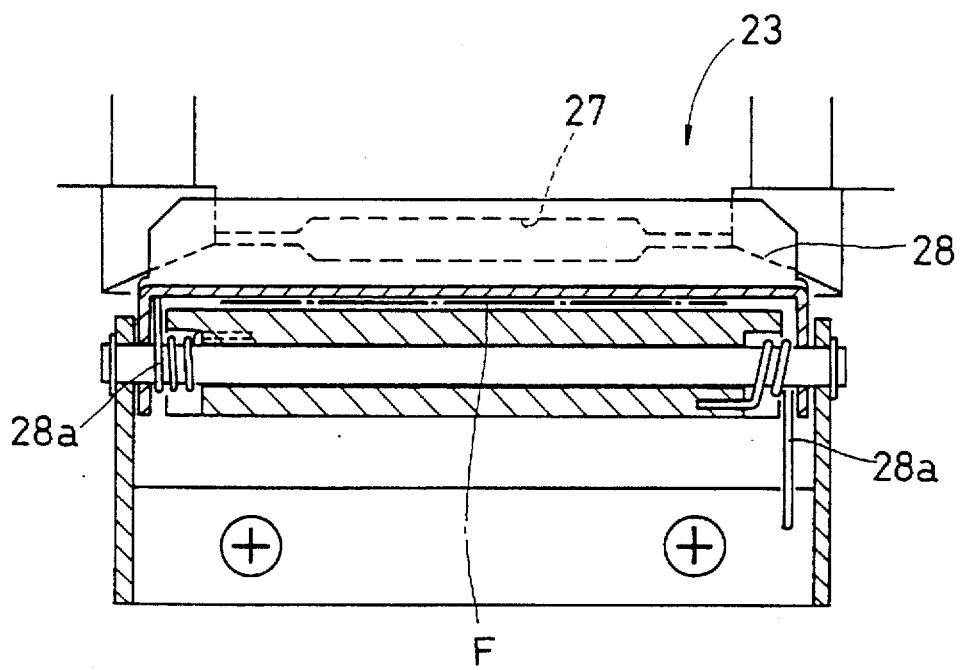
FIG. 7 is a sectional side view taken along line X—X of FIG. 8.

Referring to FIGS. 3 and 6, in order to feed films out of the magazine case 11, the magazine case is set in position, and the leading end of the outermost film F is inserted between a feed roller 21 and a backup (pressure) roller 19 of the guide unit 20 that are located near the film outlet of the magazine case 11. In this state, the feed roller 21 is rotated by rotating its rotary shaft to feed the film F out of the magazine case. The film F is thus fed into the guide unit 20. The feed roller 21 is a one-way roller. If the tension in the film F being fed by the roller 21 exceeds a predetermined point, the roller 21 is adapted to disengage from the driving source. When the tension in the film drops below the predetermined point thereafter, the roller 21 engages again to feed the film again.

Figure 9:
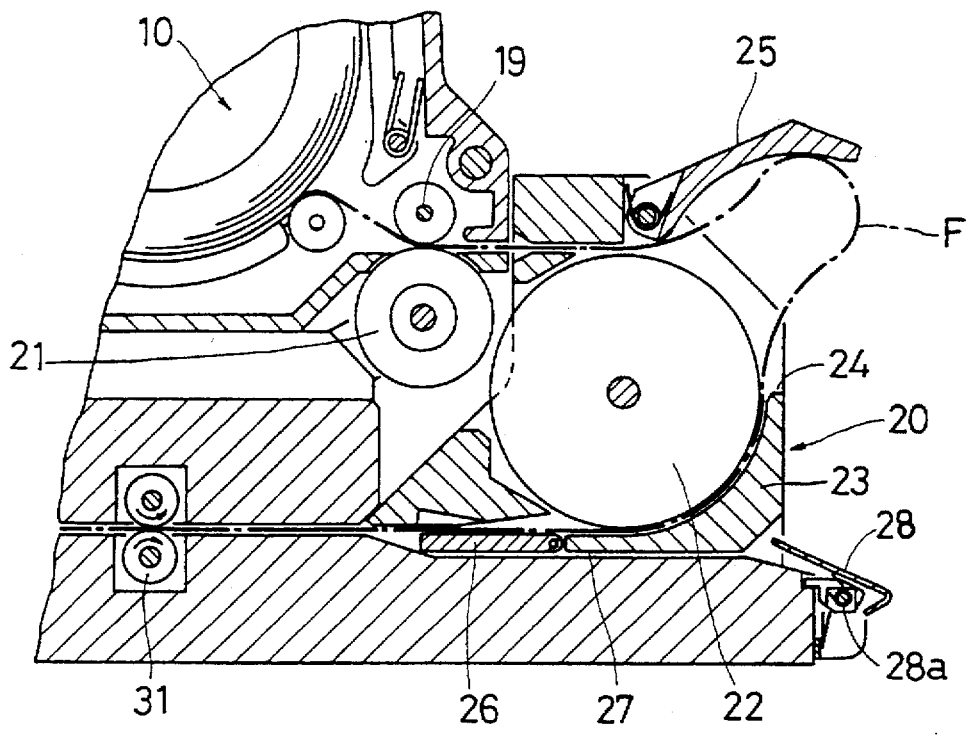
FIGS. 9–12 are sectional views illustrating operation of the device.

Films are fed through a film feed passage in the guide unit 20. The film feed passage is defined by the outer periphery of a turn roller 22 and the inner surface of an outer guide 23. The outer guide 23 has a window 24 in which is fitted a pivotable loop guide 25. If a film in the guide unit 20 is fed backward, its rear end, held between the rollers 21 and 19, cannot move backward because the roller 21 is irreversible. Thus, the film will curl while pushing up the loop guide 25 as shown in FIG. 9. While films are being fed forward, the loop guide 25 is kept closed by a spring 25a whose spring force is weak enough so that the loop guide 25 is easily pivotable by being pushed by a film.

The guide unit 20 has a vertically pivotable non-return guide 26 provided at its discharge end. It is biased upward by an unillustrated spring. Films F are fed from the guide unit 20 toward the film carrier unit 30 while pushing down the guide 26 (see FIGS. 3, 6 and 9).

A passage 27 branches from the discharge end of the film feed passage in the guide unit 20. Any film F that is fed backward after leaving the guide unit 20 is fed into the passage 27, guided by the non-return guide 26.

Figure 8:
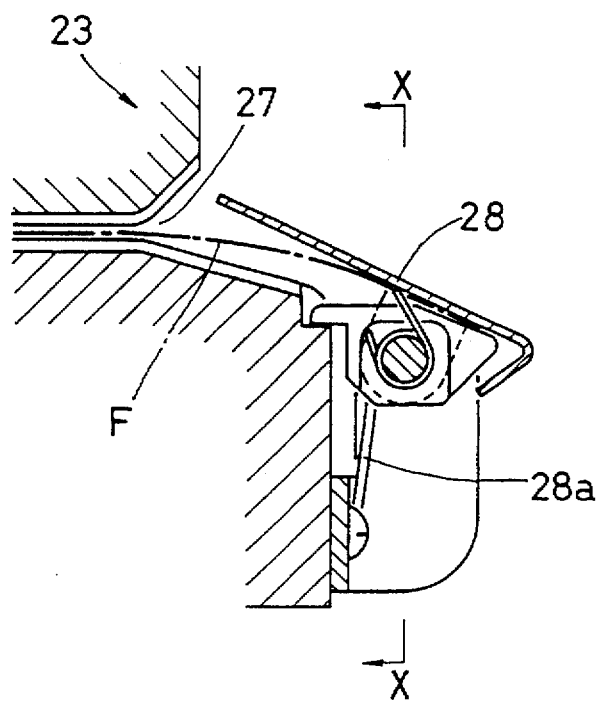
FIG. 8 is a partial enlarged view of FIG. 6.
Figure 10:
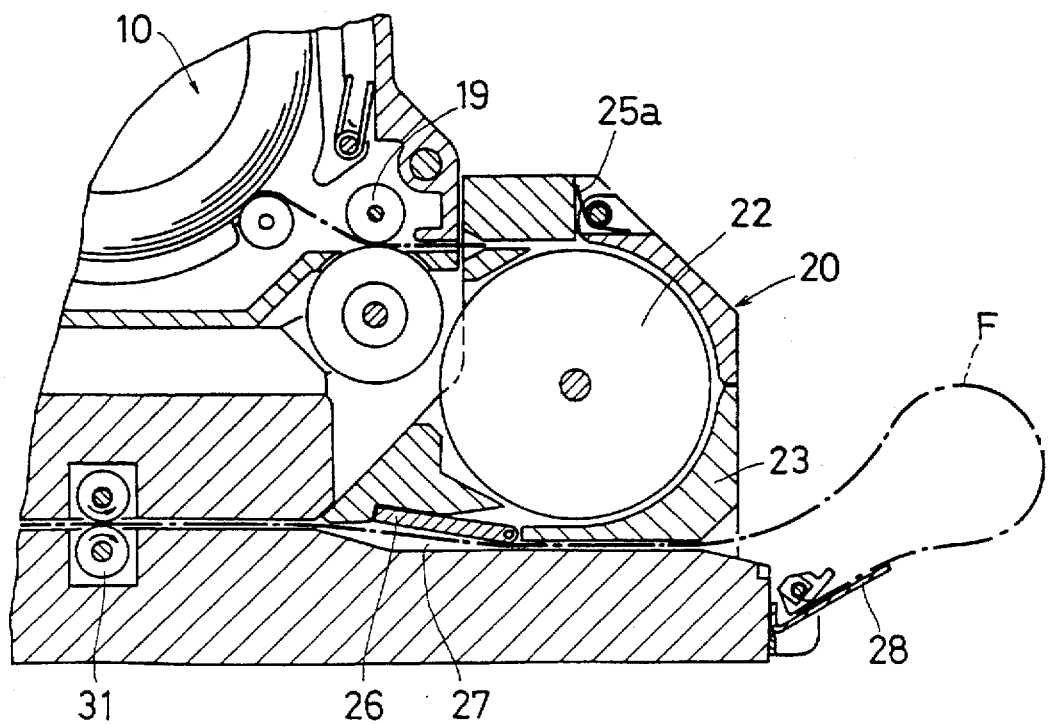

A support plate 28 is provided at the outlet opening of the passage 27. It is biased by a spring 28a to close, normally, the outlet opening of the passage 27 as shown in FIGS. 6, 8 and 9. If a film is fed into the passage 27 and its leading end engages the support plate, it will pivot, allowing the film to be looped as shown in FIG. 10.

Figure 11:
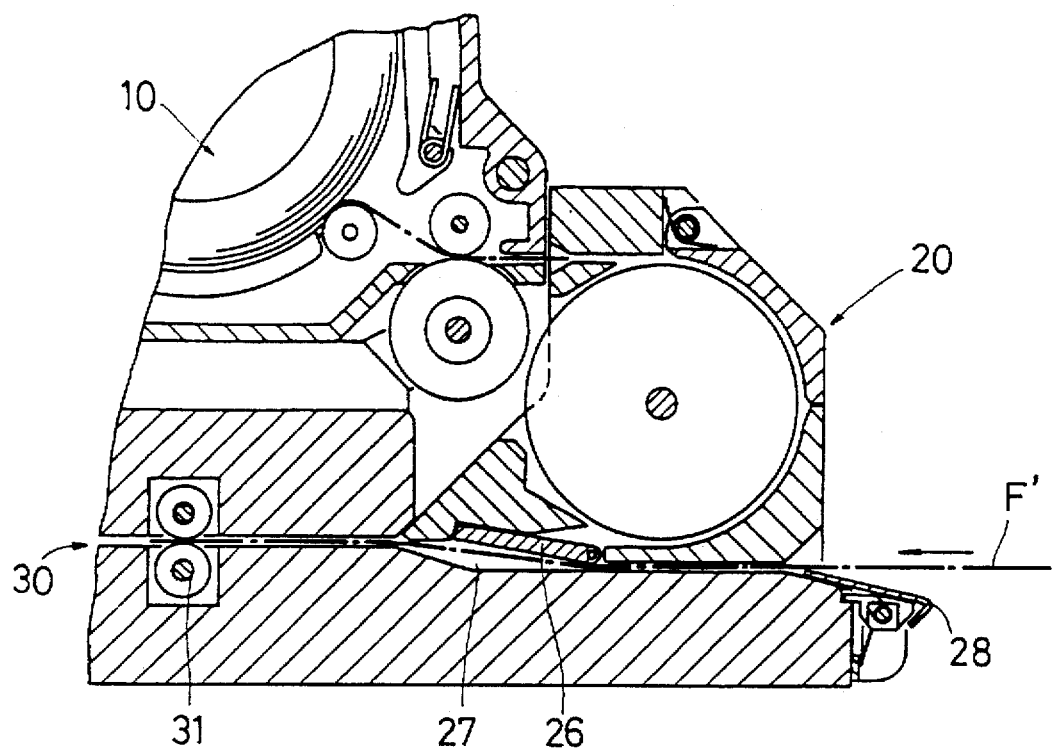
Figure 12:
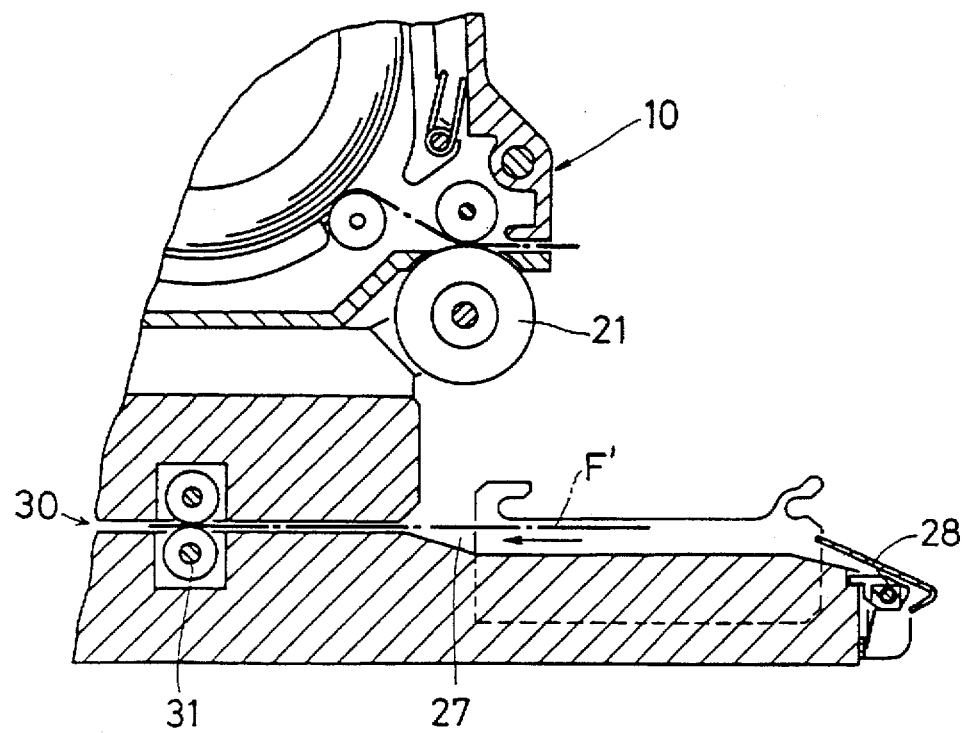

It is possible to feed an extra film F' into the passage 27 from its opening in the manner as shown in FIG. 11 to print this film while interrupting the normal printing process. In the state of FIG. 11, the support plate 28 is serving as a guide. If such an extra film F' is too short (carrying e.g. only two image frames), the guide unit 20 may have to be detached as shown in FIG. 12, before feeding the film F' into the film carrier unit 30. After printing, this film F' is fed back into the passage 27. A film feed passage for interrupting printing may be provided separately from the passage 27.

A film F fed into the film carrier unit 30 is fed forward (left) or backward (right) by rollers 31. While being fed in the carrier unit, the film is scanned and printed.

Figure 13:
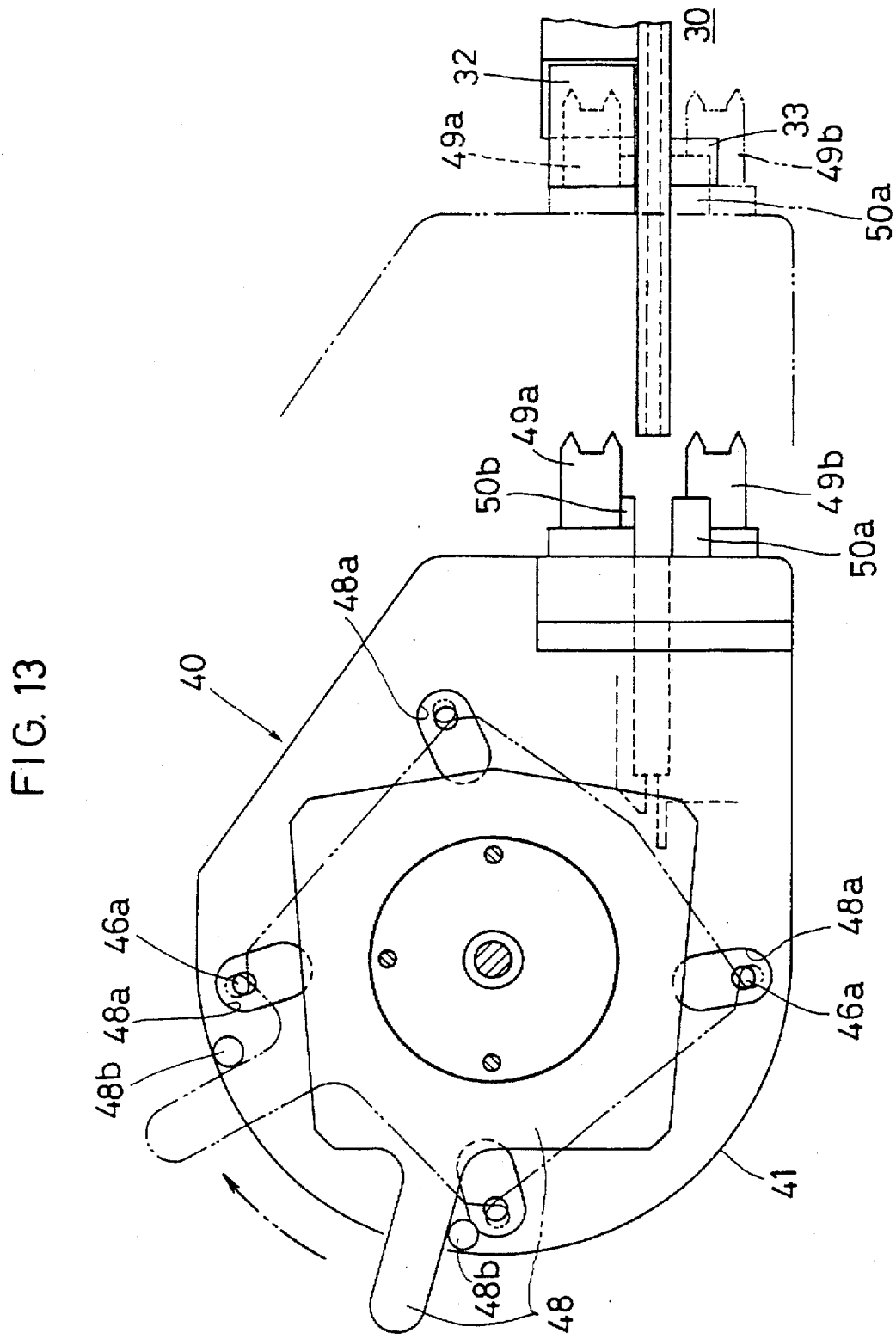
FIG. 13 is a rear view of the film storage device.
Figure 14:
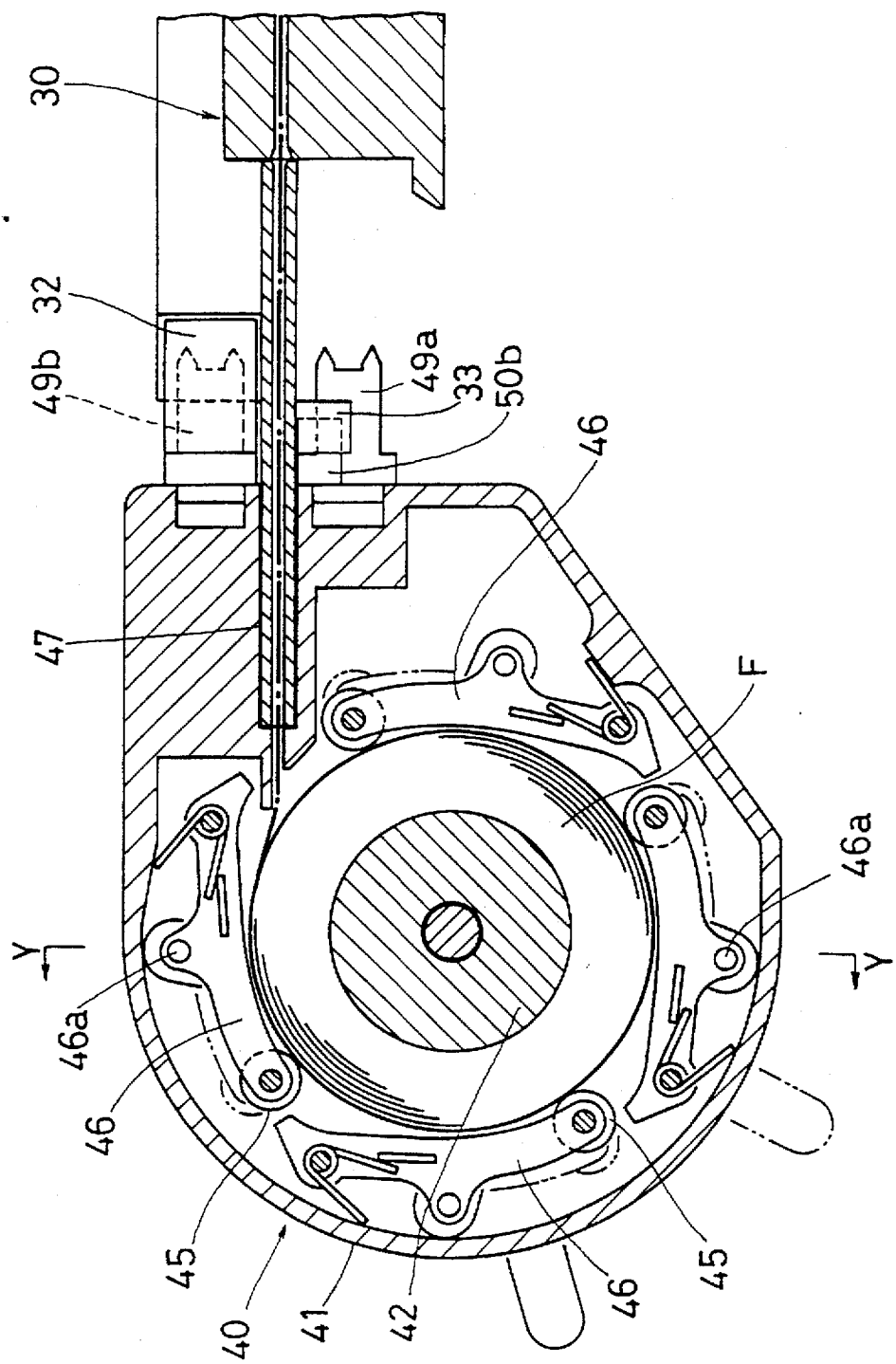
FIG. 14 is a partial enlarged view of FIG. 3.
Figure 15:
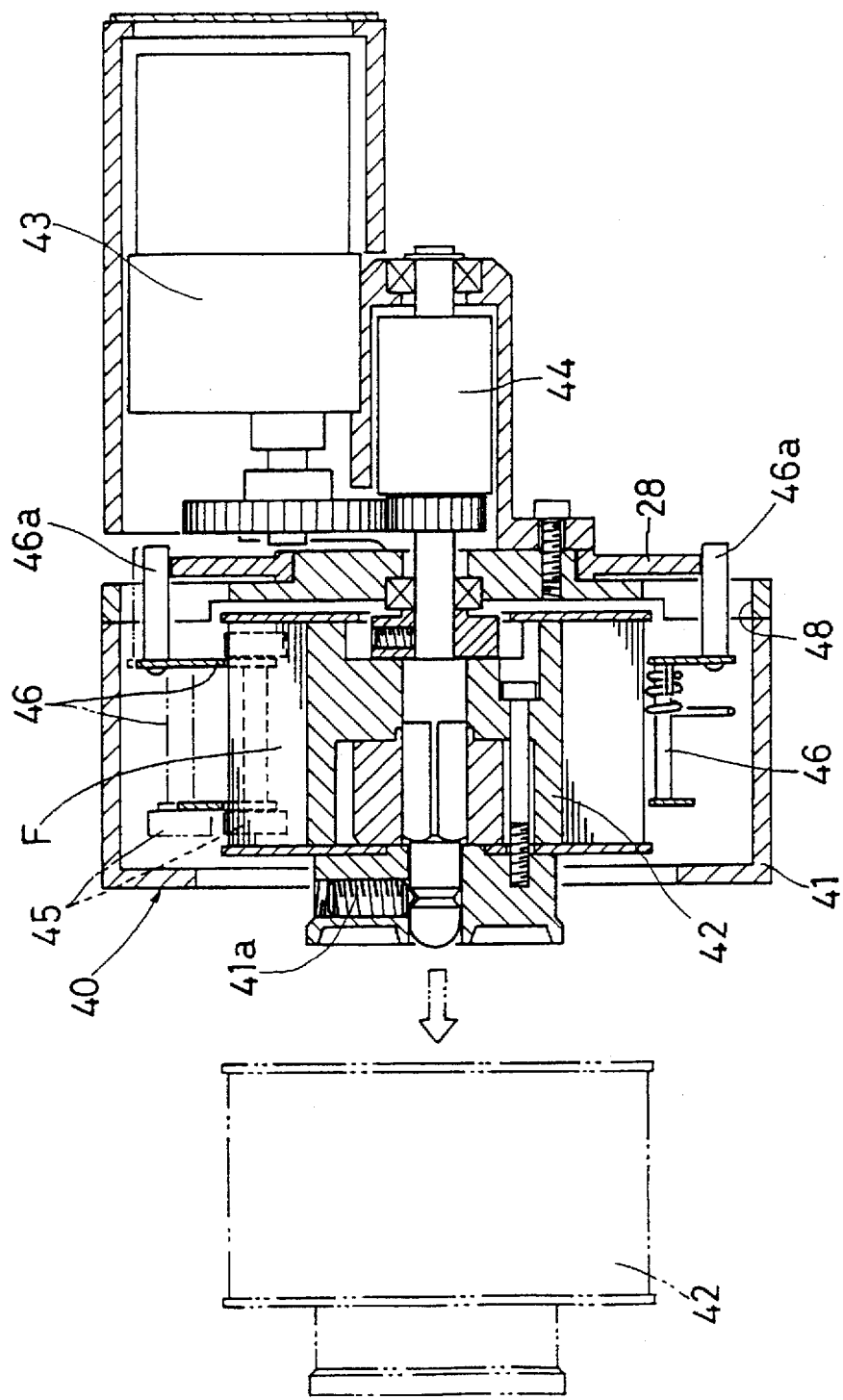
FIG. 15 is a lefthand side view taken along line Y—Y of FIG. 14.
Figure 16:
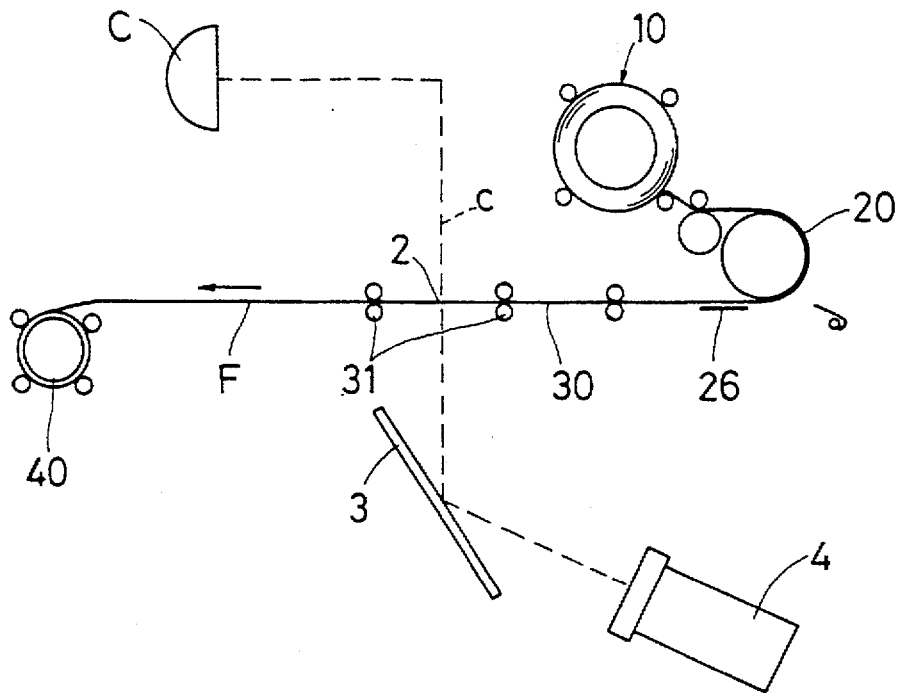
FIGS. 16–19 are schematic views illustrating the operation of the device.

As shown in FIG. 3, the film winder 40 is detachably mounted to the discharge end of the film carrier unit 30. As shown in FIGS. 13–15, it has a magazine case 41 and a film take-up core 42 rotatably mounted in the magazine case 41. Films F are wound around the core 42 by rotating the core 42 by a motor 43. A torque limiter 44 is provided to limit the torque transmitted to the core so that the tension in films will not exceed a predetermined limit. The film take-up core 42 is detachable from the magazine case 41 as shown in FIG. 41. A known catch 41a is used to prevent the core 42 from coming off the magazine case 41.

A plurality of guides 46 each carrying a roller 45 are mounted in the magazine case 41. These guides 46 are structurally the same as the guides mounted in the magazine case 11 of the automatic film feeder 10. Films fed through a film introducing guide 47 into the magazine case 41 can be smoothly and reliably wound around the core 42 by the guides 46 and rollers 45.

A cam 48 is mounted on one side wall of the magazine case 41 so as to be rotatable about its center. The guides 46 have pins 46a that extend through holes 48a formed in the side wall and engage the outer periphery of the cam 48. When the cam 48 is in the position shown by solid lines in FIG. 13, the pins 46a are freely movable in the holes 48a. In this state, the spring-biased guides 46 are pivoted toward the center of the core, so that films F are pressed against the core 42 by the rollers 45. When the cam 48 is in the position shown by dashed lines, the pins 46a are pushed radially outward by the cam 48, so that the guides 46 and their rollers 45 are also pushed toward the inner surface of the magazine case 41 as shown by dashed lines in FIG. 14. The core 42 can be detached in this state. The movement of the cam 48 is restricted by stoppers 48b.

The magazine case 41 is attached to the carrier unit 30 by means of two electric connectors 49a and 49b. The connector 49a is for lateral printing, while the connector 49b is for longitudinal printing. Namely, for lateral printing, the magazine case 41 is mounted as shown in FIG. 13 so that the connector 49a engages a connector 32 of the carrier unit 30. For longitudinal printing, the magazine case 41 is mounted as shown in FIG. 14 so that the connector 49b engages the connector 32. Motor 43 is controlled differently depending upon which of the connectors 49a and 49b fits in the connector 32. Ball catches 50a and 50b are provided to prevent the magazine case 41 from coming off the carrier unit 30. In the figures, numeral 33 indicates a catcher for the ball catchers 50a, 50b. The ball catches 50a and 50b are provided axially offset from the respective connectors 49a and 49b, so that when one of the connectors 49a and 49b fits in the connector 32, the corresponding ball catch 50a or 50b engages in the catcher 33, which is axially offset from the connector 32.

The operation of this embodiment now will be described with reference to FIGS. 16–19.

When a film F is fed from the automatic film feeder 10 through the guide unit 20 into the film carrier unit 30, image data are read from each frame of the film by a scanner 4 in the carrier unit 30 through the negative mask 2 and the mirror 3.

If the scanner detects an image-missing frame on the film F, this fact is displayed as a warning message. Then, the film F is manually fed backward. If, in this state, the rear end of the film F is still held between the feed rollers 31, the film will curl by pushing up the loop guide 25 as shown in FIG. 9. If the rear end of the film has already passed the non-return guide 26, the film will be fed into the passage 27.

Figure 17:
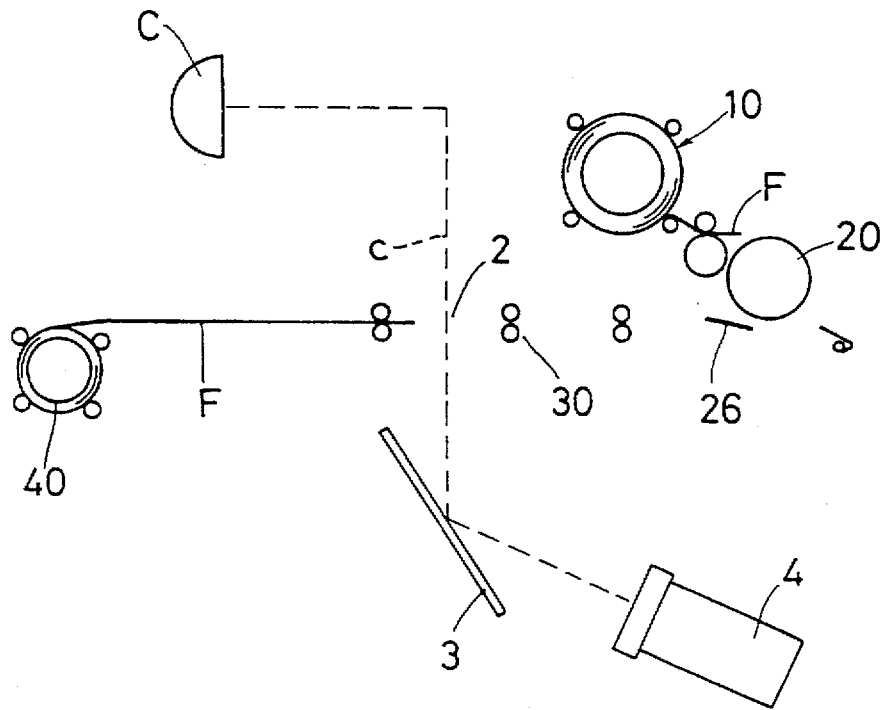
Figure 18:
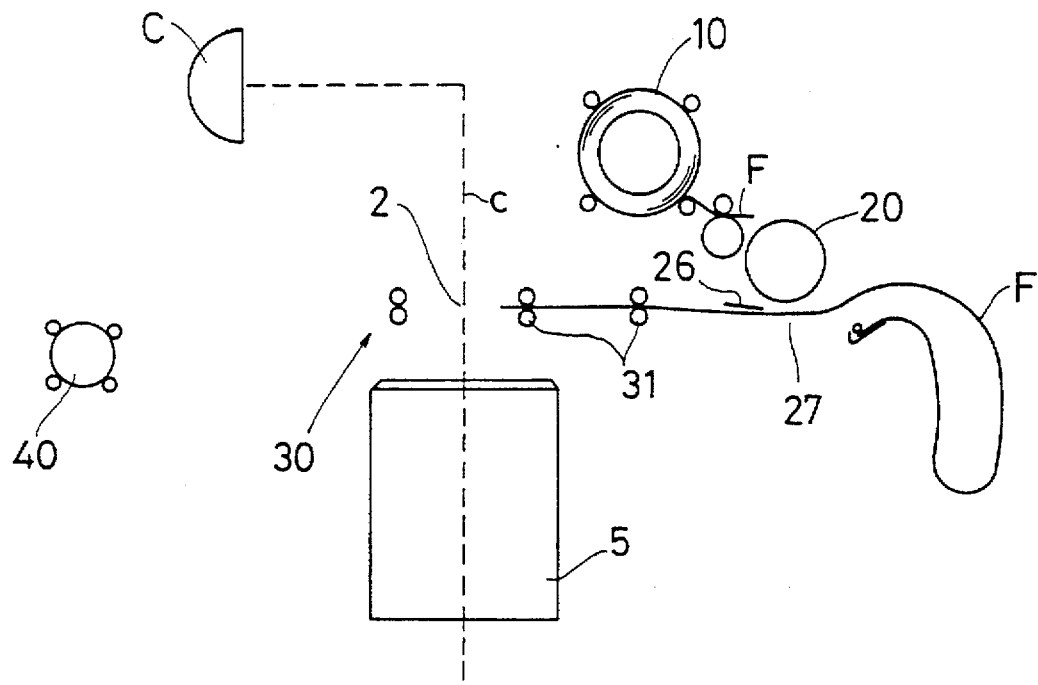
Figure 19:
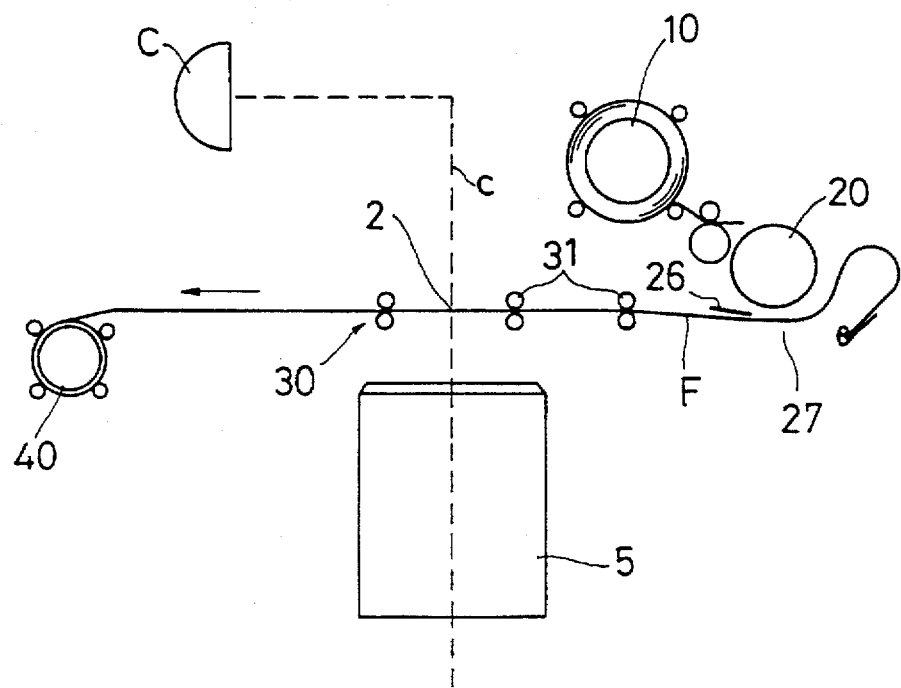

Each film F discharged from the carrier unit 30 is fed into the film winder 40 and wound around the core 42. When all the frames of one film F have been scanned as shown in FIG. 17, the film F is fed backward into the passage 27 until it forms a loop as shown in FIG. 18. While the film is being fed backward, the motor 43 is deactivated, so that back tension is applied to the film by the torque limiter 44.

When the leading end of the film F being fed backward has passed the optical axis c (negative mask 2), the film is now fed forward intermittently to print the image on each frame of the film onto printing paper P, based on the image data read by the scanner. After printing, the film F is fed into the film winder 40.

Films F stored in the automatic film feeder 10 are printed one after another in the above-described manner.

The film winder 40 and the loop-forming means or the support plate 28 may be interchanged with each other so as to print and wind films while feeding them backward.

Figure 20:
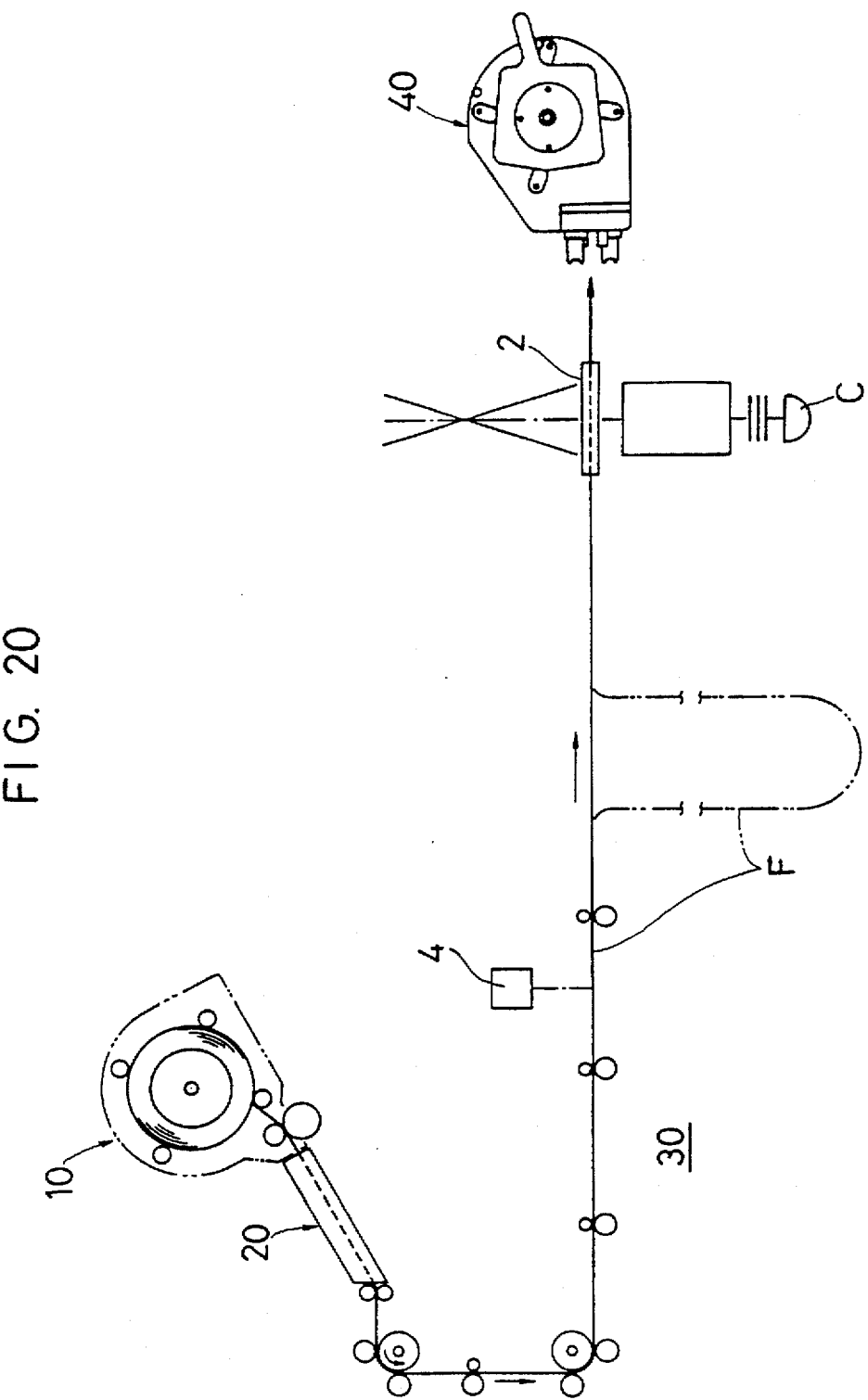
FIG. 20 is a schematic view of another embodiment.

In the above embodiment, films F are scanned and printed by moving them in two opposite directions. In the embodiment shown in FIG. 20, films are scanned and printed by feeding them in one direction. The film winder 40 is provided at the downstream end of the film feed path. In this embodiment, films may be manually fed one by one into the film feed path by detaching the automatic film feeder 10.

The automatic film feeder 10 and the guide unit 20 of the invention can be used in a photoprinting device having no film winder 40.

What is claimed is:

1. A film storage device provided in a photoprinting device having a scanner unit and an exposure unit at a film discharge port of said exposure unit, said film storage device comprising:

a magazine case provided at said film discharge port of said exposure unit;

a motor-driven film take-up core rotatably mounted in said magazine case;

a plurality of film take-up guides provided around said film take-up core so that free ends thereof are movable toward and away from an axis of said film take-up core;

a plurality of rollers each carried by a respective said take-up guide at said free end thereof;

said film take-up guides being adapted to guide and wind films around said film take-up core, said rollers being spring-biased toward said axis of said film take-up core; and a film introducing guide provided at a film inlet port of said magazine case for guiding films discharged from said exposure unit into said magazine case.

2. A film storage device as claimed in claim 1 wherein said magazine case has a means for moving said film take-up guides and said rollers away from said axis of said film take-up core, and wherein said film take-up core is detachably mounted in said magazine case.

3. A film storage device as claimed in claim 1 wherein said magazine case can be detachably mounted on said exposure unit at said film discharge port with one end of said inlet port of said magazine case opposite to one end of said film discharge port of said exposure unit and with said one end of said inlet port opposite to the other end of said film discharge port, said magazine case carrying an electric connector for longitudinal printing and an electric connector for lateral printing, one of said electric connectors for longitudinal printing and transverse printing being adapted to be connected to an electric connector of said exposure unit provided near said film discharge port when said magazine case is mounted on said exposure unit with said one end of said inlet port opposite to said one end of said film discharge port, while the other of said electric connectors for longitudinal printing and transverse printing being adapted to be connected to said electric connector of the exposure unit when said magazine case is mounted on said exposure unit with said one end of said inlet port opposite to said other end of said film discharge port.

4. An automatic film feed/storage device for automatically feeding films to a scanner unit and an exposure unit of a photoprinting device and for automatically storing films after printing, said automatic film feed/storage device comprising a film magazine detachably mounted on an outer case of said photoprinting device and having a film take-up core, a feed roller for feeding a plurality of films wound around said film take-up core one by one out of said film magazine, a film guide for guiding films fed out of said film magazine into a film feed path in said outer case, carrier rollers for feeding films in said film feed path into said scanner unit and said exposure unit, and the film storage device as claimed in claim 1, said film guide having a loop guide adapted to be moved to an open position by being pushed by a film which is being fed backward and slackening in said film guide.

5. An automatic film feed/storage device as claimed in claim 4 wherein said film guide comprises an inner guide and an outer guide between which is defined a film passage, and wherein said outer guide has a window in which is fitted said loop guide, said loop guide having a rear end, with respect to the film feed direction, pivotally supported.

6. An automatic film feed/storage device as claimed in claim 5 wherein said inner guide is a rotary drum.

7. An automatic film feed/storage device as claimed in claim 5 wherein a first extra film passage for inserting extra films for printing branches from a connecting point between said film passage defined between said inner and outer guides and said film feed path in said outer case.

8. An automatic film feed/storage device as claimed in claim 7 wherein a second extra film passage branches from said connecting point between said film passage defined between said inner and outer guides and said film feed path in said outer case, and wherein a non-return guide is provided at a branch point of said second extra film passage for guiding a film being fed backward in said film feed path into said second extra film passage, while preventing the film from feeding into said film guide.

9. An automatic film feed/storage device as claimed in claim 7 wherein a non-return guide is provided at a branch point of said first extra film passage for guiding a film being fed backward in said film feed path into said first extra film passage, while preventing the film from feeding into said film guide.

10. A method of printing films by feeding films into a scanner unit and an exposure unit of a photoprinting machine using an automatic film feed device and an automatic film storage device, said scanner unit and said exposure unit being provided at the same location along a film feed path, said method comprising the steps of:

feeding a film into said scanner unit, scanning said film while feeding a scanned portion thereof into said film storage device;

feeding said film backward after scanning so that said film is guided into an extra film passage in said film feed device and branching from said film feed path and is looped at an opening of said extra film passage;

feeding said film from said extra film passage into said exposure unit; and printing said film while feeding a printed portion thereof into said film storage device.

11. A method of printing films by feeding films into a scanner unit and an exposure unit of a photoprinting machine using automatic film feed device and an automatic film storage device, said scanner unit and said exposure unit being provided at the same location along a film feed path, said method comprising the steps of:

attaching said film storage device to an opening of an extra film passage branching from said film feed path;

attaching a film looping means to a film discharge port of said exposure unit;

feeding said film into said scanner unit and therein scanning said film while feeding a scanned portion thereof to said film looping means to store said film by looping it;

feeding said film backward after said scanning and printing said film while passing said film through said exposure unit; and guiding the thus printed film through said extra film passage into said film storage device.

* * * * *